DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 9, 1970

875 O.G. 341

T875,009

PREPARATION OF 2-CHLOROETHYL PHOSPHONATES

John M. Walts, Clark, N.J., assignor to GAF Corporation, New York, N.Y., a corporation of Delaware

Filed Sept. 10, 1969, Ser. No. 856,832
Int. Cl. C07f *9/40*
U.S. Cl. 260—970
No Drawing. 8 Pages Specification

A process for the preparation of a bis-(alkyl)-2-chloroethyl phosphonate of the formula:

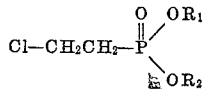

which comprises reacting vinyl chloride with a bis-(alkyl) hydrogen phosphite of the formula:

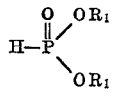

wherein $R_1$ and $R_2$ are selected from the group consisting of alkyl of 1 to about 4 carbon atoms and chloroalkyl of 2 to about 4 carbon atoms, in the presence of a free-radical catalyst at a temperature of about 125° C. to 200° C.